(12) United States Patent
Idicula et al.

(10) Patent No.: US 7,730,032 B2
(45) Date of Patent: Jun. 1, 2010

(54) EFFICIENT QUERIABILITY OF VERSION HISTORIES IN A REPOSITORY

(75) Inventors: Sam Idicula, San Jose, CA (US);
Thomas Baby, Foster City, CA (US);
Nipun Agarwal, Santa Clara, CA (US);
Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 248 days.

(21) Appl. No.: 11/332,117

(22) Filed: Jan. 12, 2006

(65) Prior Publication Data
US 2007/0162441 A1    Jul. 12, 2007

(51) Int. Cl.
*G06F 7/00* (2006.01)
*G06F 17/00* (2006.01)
(52) U.S. Cl. ...................................... 707/638
(58) Field of Classification Search .................. 707/203
See application file for complete search history.

(56) References Cited

U.S. PATENT DOCUMENTS

| | | | | |
|---|---|---|---|---|
| 4,439,837 A | * | 3/1984 | Aiena et al. .................. | 711/117 |
| 4,536,873 A | * | 8/1985 | Leete ......................... | 370/424 |
| 5,088,032 A | * | 2/1992 | Bosack ....................... | 709/242 |
| 5,295,261 A | | 3/1994 | Simonetti | |
| 5,313,646 A | | 5/1994 | Hendricks | |
| 5,404,513 A | | 4/1995 | Powers et al. | |
| 5,467,471 A | | 11/1995 | Bader | |
| 5,553,216 A | * | 9/1996 | Yoshioka et al. ............ | 715/210 |
| 5,678,040 A | | 10/1997 | Vasudevan et al. | |
| 5,680,614 A | | 10/1997 | Bakuya et al. | |
| 5,706,510 A | | 1/1998 | Burgoon | |

(Continued)

FOREIGN PATENT DOCUMENTS

EP    1 241 589    9/2002

(Continued)

OTHER PUBLICATIONS

Agarwal et al, U.S. Appl. No. 11/313,526, filed Dec. 20, 2005.*

(Continued)

*Primary Examiner*—James Trujillo
*Assistant Examiner*—Marc Somers
(74) *Attorney, Agent, or Firm*—Hickman Palermo Truong & Becker LLP

(57) ABSTRACT

Efficient evaluation of resource version history queries is enabled by using a data container storing records corresponding to links between successive versions of a resource. The records include: (a) a record identifier, (b) a predecessor identifier, (c) a successor identifier, (d) a predecessor rowset, which comprises the record identifier of each record in which the predecessor identifier in this record is the successor identifier, and (e) a successor rowset, which comprises the record identifier of each record in which the successor identifier in this record is the predecessor identifier. Depending on the nature of a request, a record is identified in which a particular version is identified by either the predecessor identifier or the successor identifier. Either the predecessor or successor rowsets are recursively read, while the predecessor or successor identifiers corresponding to each record read are added to a result set, thereby forming the ancestor or descendant version history.

17 Claims, 4 Drawing Sheets

U.S. PATENT DOCUMENTS

| | | | |
|---|---|---|---|
| 5,724,577 A | 3/1998 | Exley et al. |
| 5,734,887 A | 3/1998 | Kingberg et al. |
| 5,734,899 A * | 3/1998 | Yoshizawa et al. ........ 707/203 |
| 5,751,949 A | 5/1998 | Thomson et al. |
| 5,787,428 A | 7/1998 | Hart |
| 5,878,415 A | 3/1999 | Olds |
| 5,924,088 A | 7/1999 | Jakobsson et al. |
| 5,974,407 A | 10/1999 | Sacks |
| 5,987,506 A * | 11/1999 | Carter et al. ........... 709/213 |
| 6,003,040 A | 12/1999 | Mital et al. |
| 6,038,563 A | 3/2000 | Bapat et al. |
| 6,055,544 A | 4/2000 | DeRose et al. |
| 6,061,684 A | 5/2000 | Glasser et al. |
| 6,085,188 A * | 7/2000 | Bachmann et al. ........... 707/3 |
| 6,128,610 A | 10/2000 | Srinivasan et al. |
| 6,141,655 A | 10/2000 | Johnson et al. |
| 6,154,741 A | 11/2000 | Feldman |
| 6,189,012 B1 | 2/2001 | Mital et al. |
| 6,199,195 B1 | 3/2001 | Goodwin et al. |
| 6,208,993 B1 | 3/2001 | Shadmone |
| 6,236,988 B1 | 5/2001 | Aldred |
| 6,263,332 B1 | 7/2001 | Nasr et al. |
| 6,269,380 B1 | 7/2001 | Terry et al. |
| 6,279,006 B1 | 8/2001 | Shigemi et al. |
| 6,279,007 B1 | 8/2001 | Uppala |
| 6,298,349 B1 | 10/2001 | Toyoshima et al. |
| 6,343,287 B1 | 1/2002 | Kumar et al. |
| 6,356,920 B1 | 3/2002 | Vandersluis |
| 6,366,902 B1 | 4/2002 | Lyle et al. |
| 6,366,934 B1 | 4/2002 | Cheng et al. |
| 6,370,537 B1 | 4/2002 | Gilbert et al. |
| 6,381,607 B1 | 4/2002 | Wu et al. |
| 6,427,123 B1 | 7/2002 | Sedlar |
| 6,460,052 B1 | 10/2002 | Thomas |
| 6,470,344 B1 | 10/2002 | Kothuri et al. |
| 6,487,546 B1 | 11/2002 | Witkowski |
| 6,496,842 B1 | 12/2002 | Lyness |
| 6,519,597 B1 | 2/2003 | Cheng et al. |
| 6,539,398 B1 | 3/2003 | Hannan et al. |
| 6,571,231 B2 | 5/2003 | Sedlar |
| 6,581,060 B1 | 6/2003 | Choy et al. |
| 6,587,854 B1 | 7/2003 | Guthrie et al. |
| 6,604,100 B1 | 8/2003 | Fernandez et al. |
| 6,609,121 B1 | 8/2003 | Ambrosini et al. |
| 6,631,366 B1 | 10/2003 | Nagavamsi et al. |
| 6,631,386 B1 | 10/2003 | Arun et al. |
| 6,636,845 B2 | 10/2003 | Chau et al. |
| 6,662,342 B1 | 12/2003 | Marcy |
| 6,684,227 B2 | 1/2004 | Duxbury |
| 6,704,739 B2 | 3/2004 | Craft et al. |
| 6,704,747 B1 | 3/2004 | Fong |
| 6,708,186 B1 | 3/2004 | Claborn et al. |
| 6,718,322 B1 | 4/2004 | Brye |
| 6,725,212 B2 | 4/2004 | Couch et al. |
| 6,754,661 B1 | 6/2004 | Hallin et al. |
| 6,772,350 B1 | 8/2004 | Belani et al. |
| 6,785,673 B1 | 8/2004 | Fernandez et al. |
| 6,785,769 B1 | 8/2004 | Jacobs et al. |
| 6,801,224 B1 | 10/2004 | Lewallen |
| 6,826,727 B1 | 11/2004 | Mohr et al. |
| 6,836,778 B2 | 12/2004 | Manikutty et al. |
| 6,836,857 B2 | 12/2004 | Ten-Hove et al. |
| 6,920,457 B2 | 7/2005 | Pressmar |
| 6,959,416 B2 | 10/2005 | Manning et al. |
| 6,964,025 B2 | 11/2005 | Angiulo et al. |
| 6,965,894 B2 | 11/2005 | Leung et al. |
| 7,031,956 B1 | 4/2006 | Lee et al. |
| 7,043,488 B1 | 5/2006 | Bauer et al. |
| 7,089,239 B1 | 8/2006 | Baer et al. |
| 7,117,216 B2 | 10/2006 | Chakraborty et al. |
| 7,139,746 B2 | 11/2006 | Shin et al. |
| 7,200,595 B2 | 4/2007 | Dutta et al. |
| 7,287,033 B2 | 10/2007 | Shadmon et al. |
| 2002/0056025 A1 | 5/2002 | Qiu et al. |
| 2002/0073019 A1 | 6/2002 | Deaton |
| 2002/0095421 A1 | 7/2002 | Koskas |
| 2002/0116371 A1 | 8/2002 | Dodds et al. |
| 2002/0116457 A1 | 8/2002 | Eshleman et al. |
| 2002/0133484 A1 | 9/2002 | Chau et al. |
| 2002/0143512 A1 | 10/2002 | Shamoto et al. |
| 2002/0143906 A1 | 10/2002 | Tormasov et al. |
| 2002/0147634 A1 | 10/2002 | Jacoby et al. |
| 2002/0156811 A1 | 10/2002 | Krupa |
| 2002/0184188 A1 | 12/2002 | Mandyam et al. |
| 2002/0184401 A1 | 12/2002 | Kadel, Jr. et al. |
| 2003/0004937 A1 | 1/2003 | Salmenkaita et al. |
| 2003/0009361 A1 | 1/2003 | Hancock et al. |
| 2003/0018618 A1 | 1/2003 | Bestgen et al. |
| 2003/0033285 A1 | 2/2003 | Jalali et al. |
| 2003/0065659 A1 | 4/2003 | Agarwal et al. |
| 2003/0078906 A1 | 4/2003 | Ten-Hove et al. |
| 2003/0093672 A1 | 5/2003 | Cichowlas |
| 2003/0101169 A1 | 5/2003 | Bhatt et al. |
| 2003/0101194 A1 | 5/2003 | Rys et al. |
| 2003/0172135 A1 | 9/2003 | Bobick et al. |
| 2003/0182624 A1 | 9/2003 | Large |
| 2003/0212662 A1 | 11/2003 | Shin et al. |
| 2004/0043758 A1 | 3/2004 | Sorvari et al. |
| 2004/0064466 A1 | 4/2004 | Manikutty et al. |
| 2004/0073541 A1 | 4/2004 | Lindblad et al. |
| 2004/0083222 A1 | 4/2004 | Pecherer |
| 2004/0088306 A1 | 5/2004 | Murthy et al. |
| 2004/0103105 A1 | 5/2004 | Lindblad et al. |
| 2004/0148278 A1 | 7/2004 | Milo et al. |
| 2004/0176958 A1 | 9/2004 | Salmenkaita et al. |
| 2004/0205082 A1 | 10/2004 | Fontoura et al. |
| 2004/0220912 A1 | 11/2004 | Manikutty et al. |
| 2004/0225680 A1 | 11/2004 | Cameron et al. |
| 2004/0230667 A1 | 11/2004 | Wookey |
| 2004/0267760 A1 | 12/2004 | Brundage et al. |
| 2005/0050058 A1 | 3/2005 | Jain et al. |
| 2005/0050092 A1 | 3/2005 | Jain et al. |
| 2005/0091188 A1 | 4/2005 | Pal et al. |
| 2005/0097084 A1 | 5/2005 | Balmin et al. |
| 2005/0097108 A1 | 5/2005 | Wang et al. |
| 2005/0120031 A1 | 6/2005 | Ishii |
| 2005/0144198 A1 | 6/2005 | Bergstraesser et al. |
| 2005/0216465 A1 | 9/2005 | Dutta et al. |
| 2005/0228792 A1 | 10/2005 | Chandrasekaran et al. |
| 2005/0229158 A1 | 10/2005 | Thusoo et al. |
| 2005/0289125 A1 | 12/2005 | Liu et al. |
| 2006/0095421 A1 | 5/2006 | Nagai et al. |
| 2006/0101003 A1 | 5/2006 | Carson et al. |
| 2006/0101320 A1 | 5/2006 | Dodds et al. |
| 2006/0129584 A1 | 6/2006 | Hoang et al. |
| 2006/0271606 A1 | 11/2006 | Tewksbary |
| 2006/0288056 A1 | 12/2006 | Yamakawa et al. |
| 2007/0011167 A1 | 1/2007 | Krishnaprasad et al. |
| 2007/0043715 A1 | 2/2007 | Kaushik et al. |
| 2007/0118561 A1 | 5/2007 | Idicula et al. |

FOREIGN PATENT DOCUMENTS

| | | |
|---|---|---|
| JP | 06-348575 | 12/1994 |
| WO | WO 00/49533 | 8/2000 |
| WO | WO 01/42881 | 6/2001 |
| WO | WO 01/59602 | 8/2001 |
| WO | WO 01/61566 | 8/2001 |
| WO | WO 03/027908 | 4/2003 |

OTHER PUBLICATIONS

Idicula et al, U.S. Appl. No. 11/316,777, filed Dec. 22, 2005.*
Idicula et al, U.S. Appl. No. 11/316,803, filed Dec. 22, 2005.*
Idicula et al, U.S. Appl. No. 11/304,414, filed Dec. 14, 2005.*

Ge et al, U.S. Appl. No. 11/360,792, filed Feb. 22, 2006.*
Geoff Lee, "Oracle Database 10g Release 2 XML DB Technical Overview" An Oracle White Paper, May 2005, 28 pages, Oracle Corporation, Redwood Shores, California.
Mark Drake, "Oracle Database 10g Release 2 XML DB" An Oracle Technical White Paper, May 2005, 97 pages, Oracle Corporation, Redwood Shores, California.
Mark D. Drake, "Oracle Database 10g Release 2 XML DB & XML DB Repository" Oracle Data Sheet, May 2005, 6 pages, Oracle Corporation, Redwood Shores, California.
"Managing Content with Oracle XML DB", An Oracle White Paper, Mar. 2005, 38 pages, Redwood Shores, California.
Geoff Lee et al., "Mastering XML DB Storage in Oracle Database 10g Release 2" An Oracle White Paper, Mar. 2005, 15 pages, Oracle Corporation, Redwood Shores, California.
Geoff Lee, "Mastering XML DB Repository in Oracle Database 10g Release 2" An Oracle White Paper, Mar. 2005, 15 pages, Redwood Shores, California.
Sean Dillon, "Getting to XML", Oracle Magazine, May/Jun. 2005, 3 pages.
Oracle XML DB Developer's Guide 10g Release 2 (10.2) B14259-02, Aug. 2005, 24 pages.
"Oracle 9i Database Daily Feature", Oracle Technology Network, Jun. 2005, 3 pages.
Bill Beauregard, "Oracle Database 10g Workspace Manager Support for Oracle Spatial Topology Data Model" An Oracle White Paper, May 2005, 7 pages.
Bill Beauregard, "Oracle Database 10g Workspace Manager Overview" An Oracle White Paper, May 2005, 13 pages, Redwood Shores, California.
Bill Beauregard, "Using Oracle Workspace Manager to Cut Costs: Case Studies", Dec. 2003, 36 pages.
"IETF WebDAV Working Group World Wide Web Distributed Authoring and Versioning" retrieved on Feb. 22, 2006 from the Internet < URL: http:/ftp.ics.uci.edu/pub/ietf/webdav/ > 6 pages.
"Versioning Extensions to WebDAV (Web Distributed Authoring and Versioning)" retrieved on Feb. 22, 2006 from the Internet < URL: http://www.webdav.org/deltav/protocol/rfc3253.html > (110 pages).
"Versioning Extensions to WebDAV (Web Distributed Authoring and Versioning)" retrieved on Feb. 27, 2006 from the Internet < URL: http://www.webdav.org/deltav/protocol/rfc3253.html > (112 pages).
"WVCM: The Workspace Versioning and Configuration Management API" retrieved on Feb. 27, 2006 from the Internet < URL: http://www.webdav.org/deltav/wvcm/wvcm-overview.html > (16 pages).
Chou, H. et al., "A Unifying Framework for Version Control in a CAD Environment" Aug. 1986 (pp. 336-344).
Bourret, R., et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.
Braga, Daniele et al., "A Graphical Environment to Query XML Data with Query," Proceedings of the Fourth International Conference on Web Information Systems Engineering (WISE '03), 2003, IEEE, 10 pages.
Chae, Mi-Ok, et al., XP-002263364, "Design and Implementation of an Object-Oriented Multimedia DBMS Tightly Coupled with Information Retrieval Functions," Proc. 17th IASTED International Conference on Applied Informatics, Feb. 15-18, 1999, abstract.
Chakraborty, Krishnendu, "The XML Garbage Collector", The Source for Developers, Sun Developer Network Site XP-002297849, Mar. 2002.
Chen, Ruey-Shun et al., "Developing an XML framework for metadata system", Trinity College Dublin, Proc. of the 1st Inter. Sympo. on Information and Communication, pp. 267-272, 2003.
Cheng, Josephine et al., "IBM DB2 XML Extender," IEEE, ICDE '00 Conference, San Diego, Feb. 2000, 128 pages.
Cooper, Brian F. et al., "A Fast Index for Semistructured Data ," Proceeding of the International Conference on Very Large Databases, 2001, XP-002303292, pp. 341-350.

European Patent Office, "Notification Of Transmittal Of The International Search Report And The Written Opinion Of The International Searching Authority, Or The Declaration", International application No. PCT/US2007/067747, received Oct. 29, 2007, 10 pages.
Claims, International application No. PCT/US2007/067747, Oct. 2007, 4 pages.
European Patent Office, "Patent Cooperation Treaty", Application No. PCT/US2007/067747, dated Jun. 11, 2008, 6 pages.
Claims, Application No. PCT/US2007/067747, Jun. 2008, 6 pages.
Garcia-Molina, Hector, et al., "Database System Implementation", Prentice Hall, Department of Computer Science Stanford University, 2000, 27 pages.
Japanese Patent Office, "Notice of Grounds of Rejection", Foreign patent application No. 533164/2003, mailed Jul. 22, 2008, 3 pages.
Jurgens, Marcus, et al., "PISA: Performance Models for Index Structures with and without Aggregated data", German Research Society, 1999, 7 pages.
Lo et al., "XAS: A System for Accessing Componentized, Virtual XML Documents," IEEE, 2001, pp. 493-502.
Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.
McHugh, Jason, et al. "Indexing Semistructured Data," Stanford Science Department, 1998, XP-002248313, pp. 1-21.
McHugh, Jason et al., "Query Optimization for XML", XP-002333353, Proceedings of the 25th VLDB Conference (1999) pp. 315-326.
Myllymaki, Jussi, "Effective Web Data Extraction with Standard XML Technologies," WWW10, May 1-5, 2001, pp. 689-696.
Noser, Hansrudi, et al., "Dynamic 3D Visualization of Database-Defined Tree Structures on the WWW by Using Rewriting Systems," 2000, IEEE, XP-002262516, pp. 247-254.
Office Action received in U.S. Appl. No. 11/360,792 dated Jan. 23, 2008 (as transmitted by the USPTO).
Office Action (Final) received in U.S. Appl. No. 11/360,792 dated Jun. 16, 2008 (as transmitted by the USPTO).
Office Action received in U.S. Appl. No. 11/360,792 dated Nov. 4, 2008 (as transmitted by the USPTO).
Office Action received in U.S. Appl. No. 11/360,792 dated Apr. 1, 2009 (as transmitted by the USPTO).
Office Action received in U.S. Appl. No. 11/304,414 dated Jun. 11, 2009 (as transmitted by the USPTO).
Pal, Shankar et al., "Indexing XML Data Stored in a Relational Database", Proceedings of the 30th VLDB Conference, 2004, 12 pages.
Peng, Feng et al., "XPath Queries on Streaming Data" (2003) ACM Press, pp. 431-442.
Rizvi et al., "Extending Query Rewriting Techniques for Fine-Grained Access Control", SIGMOD 2004, ACM, 12 pages.
Schmidt et al., "Why and How to Benchmark XML Databases," SIGMOND Record, vol. 3, No. 3, Sep. 2001, pp. 27-32.
Vion-Dury, Jean-Yves, "XPath on Left and Right Sides of Rules: Toward Compact XML Tree Rewriting through Node Patterns" (2003) ACM Press, pp. 19-25.
Vorthmann, S. et al. "Beyond Schemas, Schema Adjuncts and the Outside World," Markup Languages, Online!, vol. 2, No. 3, Jun. 2000, pp. 1-8.
Yoshikawa, Masatoshi et al., "XRel: A Path-Based Approach to Storage and Retrieval of XML Documents Using Relational Databases", XP-001143686, ACM Transactions on Internet Technology (2001), pp. 110-141.
Zisman et al., "Using XML to Build Consistency Rules for Distributed Specifications," Proceedings of the Tenth International Workshop on Software Specification and Design (IWSD'00), IEEE 2000, 8 pages.

* cited by examiner

VERSION HISTORY TREE 102

VERSION HISTORY TABLE 104

| ROW_ID | PRED_ID | SUCC_ID | PRED_ROWSET | SUCC_ROWSET |
|---|---|---|---|---|
| 01 | | V1 | | 02 |
| 02 | V1 | V2 | 01 | 03,04 |
| 03 | V2 | V3 | 02 | 05 |
| 04 | V2 | V3.1 | 02 | 06 |
| 05 | V3 | V4 | 03 | 07 |
| 06 | V3.1 | V4.1 | 04 | 08 |
| 07 | V4 | V5 | 05 | 09 |
| 08 | V4.1 | V5 | 06 | 09 |
| 09 | V5 | | 07,08 | |

106  108  110  112  114

RESOURCE TABLE 120

| | RES_ID | CONTENT |
|---|---|---|
| (F1, V1) | 001 | ... |
| (F1, V2) | 002 | ... |
| (F1, V3) | 003 | ... |
| (F1, V3.1) | 004 | ... |
| (F1, V4.1) | 005 | ... |
| (F1, V4) | 006 | ... |
| (F1, V5) | 007 | ... |
| | ⋮ | ⋮ |
| | 00n | ... |

122  124

EFFICIENT QUERIABILITY OF VERSION HISTORIES IN A REPOSITORY

FIELD OF THE INVENTION

The present invention relates generally to data management and, more specifically, to techniques supporting querying of version histories in the context of a repository that supports file versioning.

BACKGROUND

A database may provide a file repository that can be accessed via a variety of file system-based interfaces, such as those utilizing HTTP/WebDAV (Web Distributed Authoring and Versioning) or NFS (Network File System). Through such interfaces to the repository, a file is located, for example, via its URL or path and the repository is exposed as a hierarchical set of files and folders (e.g., directories). Further, data-oriented access mechanisms can be used to access a file repository, which expose the repository as a flat set of files that can be queried based on file content or attributes.

Files (i.e., generally, "resources") can be versioned, for example, in order to keep a record of changes to files, to provide the option to revert to an older version of a file, and to get information on who made each change to a file and the progression of changes to the file. Thus, a version-controlled file is one whose versions are tracked by the repository. Because each version may need to be indexed and accessed as a separate entity, each version is typically stored in a separate row of a database table.

When a version-controlled file is checked out of the repository, updated and then checked back into the repository, a new version is created. This new, checked-in version is known as a successor of the old, checked-out version. Similarly, the old version is known as a predecessor of the new version. A version may have multiple successors, due to branches in the version history. Likewise, a version may have multiple predecessors, due to version merges. When a version is connected to another version by traversing one or more predecessor relations, it is called an "ancestor" of that version. When a version is connected to another version by traversing one or more successor relations, it is called a "descendant" of that version.

When tracking changes to a file, it is often necessary to find out what versions were the ancestors (or sometimes just the predecessors) of a given version and what versions were the descendants of the given version. This predecessor/descendant information assists in building a visualization of the version history tree, or parts of the version history tree, for a user. It becomes especially important in data-oriented access mechanisms, such as repository views, where one can use this functionality to restrict a given query to all versions prior to a given version, for example.

In view of the foregoing, there is a need for techniques for efficiently locating ancestors and descendants of a given version in a version history, in a repository that supports versioning of resources.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
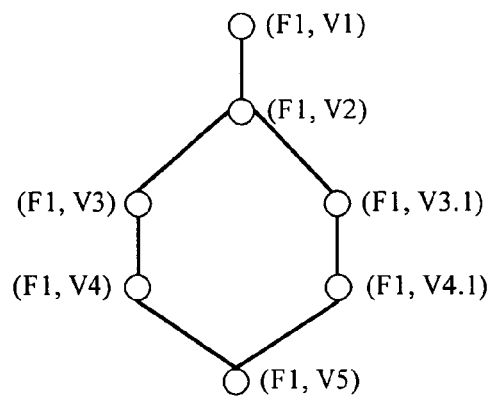
FIG. 1 is a block diagram illustrating a version history tree, and corresponding data structures used for efficiently evaluating associated version history queries on a repository that supports versioning of resources, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

Efficient evaluation of resource version history queries on a repository that supports versioning is enabled, generally, using a particular data structure in which particular version history-related data is stored. The particular data structure is generally referred to herein as the "version history" data container or table. As used herein, a "version history query" refers to a repository query that requests identification of either the ancestor history or the descendant history for a given version of a resource, or both. In other words, such a query may request the identities of all the ancestor versions of the given resource, the identities of all the descendant versions of the given resource, or the identities of both the ancestor versions and the descendant versions of the given resource.

The version history data container stores data records corresponding to links between successive versions of a resource stored in the repository. The data records include data that represents the following:

(a) a record identifier that uniquely identifies the record, (b) a predecessor identifier, which is a unique identifier of a version of the resource that immediately precedes, in the version history of the resource, the link corresponding to this record, (c) a successor identifier, which is a unique identifier of a version of the resource that immediately succeeds, in the version history of the resource, the link corresponding to this record, (d) a predecessor rowset, which comprises the record identifier of each record in which the predecessor identifier in this record is the successor identifier, and (e) a successor rowset, which comprises the record identifier of each record in which the successor identifier in this record is the predecessor identifier.

Upon receiving a version history query that identifies a particular version of a resource, a database server associated with the repository can access the version history data container to identify the record in which the particular version is identified by either the predecessor identifier or the successor identifier, depending on whether the query is for the ancestor version history or descendant version history, respectively. Then, either the predecessor rowsets or the successor rowsets are recursively read, depending on whether the query is for the ancestor version history or descendant version history, respectively, until reaching the root node or a leaf node of the version history for that resource. While recursively reading the rowsets, the predecessor identifiers or successor identifiers corresponding to each record read are added to a result set, thereby forming a set of all the particular version's ancestors (i.e., the ancestor version history) or descendants (the descendant version history), respectively.

Operating Environment-Database System

The techniques described herein may be implemented in the context of a database system and, according to one embodiment, are implemented in a database repository that supports versioning of hierarchically organized resources such as a file system-like repository. A database system typically comprises one or more clients that are communicatively coupled to a database server that is connected to a shared database. "Database server" may refer collectively to a cluster of server instances and machines on which the instances execute. Generally, a server is combination of integrated software components and an allocation of computational resources, such as memory, a node, and processes on the node for executing the integrated software components on a processor, where the combination of the software and computational resources are dedicated to providing a particular type of function on behalf of clients of the server.

Among other functions of database management, a database server governs and facilitates access to a particular database, processing requests by clients to access the database. In order for a client to interact with a server, a session is established for the client. A session, such as a database session, is a particular connection established from a client to a server, such as a database server. Through a session, the client can issue a series of requests (e.g., requests for data and/or metadata) to the database server.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command that is sent from a database application to a database server contains an original statement of the database command. For the database server to process the commands, the commands must conform to a database language supported by the database server. One non-limiting database language supported by many database servers is known as the Structured Query Language (SQL).

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A relational database system may be extended to provide native support for storage, management, and query of (and thus function as a repository for) particular types of data. For example, a traditional relational database system may be augmented with features and technologies to enable storage of XML documents directly in the database, and access to such XML data in either an XML-centric (e.g., using the XQuery query language) or a relational-centric (e.g., using the SQL query language) manner. Such a repository is at times referred to as an XML repository or an XML database (i.e., "XDB").

FIG. 1 is a block diagram illustrating a version history tree, and corresponding data structures used for efficiently evaluating associated version history queries on a repository that supports versioning of resources, according to an embodiment of the invention. FIG. 1 depicts a version history tree 102, a version history table 104, and a resource table 120.

Version History

Version history tree 102 is a graphical representation of an example of a resource version history for a version-controlled file F1, where all versions referred to in this example refer to a version of the file F1. The resource "check-in", or versioning, procedure may vary from implementation to implementation. For example, one repository may version a resource upon being copied back into the repository, whereas another repository may version a resource upon being copied back into the repository and approved via a formal approval process. Herein, use of the term "check-in" (or "checking in", "checked in", etc.) refers to any such versioning procedure.

Version history tree 102 shows that a version V2 succeeded version V1. Two different versions, V3 and V3.1, succeed version V2. For example, a first user may check out a copy of version V2 stored in the repository, while a second user checks out another copy of version V2 from the repository. The second user may check back into the repository a modified version of the second user's version V2, which becomes version V3 when checked back into the repository, whereas the first user may subsequently check back into the repository a modified version of the first user's version V2, which becomes version V3.1 when checked back into the repository. Continuing, version V4 succeeds version V3 and version V4.1 succeeds version V3.1. Version V5 represents a merge of versions V4 and V4.1 and, therefore, is depicted as succeeding both version V4 and version V4.1.

Version History Data Container-Generally

According to one embodiment, a particular data structure referred to as a version history data container is created to track and persistently store data representing the version history of a given resource in a repository that supports versioning. For example, version history table 104 is created to track the version history 102 of file F1. According to one embodiment, version history data containers are separate data structures from one or more corresponding resource data structures in which the contents of one or more resources are stored. For example, version history table 104 is a separate data structure from resource table 120. Version history containers are constantly maintained, i.e., while users are connected to the repository via respective sessions. In other words, as new versions are created and deleted, the corresponding version history container is updated accordingly, at least in volatile memory (i.e., not necessarily persistently for each update). The structure of the version history data container is described in greater detail hereafter.

Resource Table

Resource table 120 is a data table that stores records associated with multiple versions of one or more resources. For example, a resource table 120 may store all versions of all resources, or portions thereof, that are stored in the repository. The schema of resource table 120 may vary from implementation to implementation, but is depicted in FIG. 1 comprising columns for resource identifiers ('res_id') 122 and the content 124 of the respective versions of the resources.

A resource table 120 may store, in content 124, resources that represent an entire file, such as in the context of a file system-like repository. For example, each record in resource table 120 stores the entire content of a corresponding file. Furthermore, resource table 120 may store, in content 124, resources that represent a portion of the content of documents stored in a repository, such as data associated with a particular element from a group of shredded XML documents. For example, each record in a resource table 120 stores the values for a corresponding respective XML element from the group of XML documents. For another example, each record in a resource table 120 stores the values for corresponding attributes from an object of a class, or stores the values for a corresponding attribute from multiple objects of a class. The manner in which resource data is stored in an implementation of a resource table 120 may vary from implementation to implementation and, therefore, the foregoing are presented as non-limiting examples.

Version History Data Container Structure

According to one embodiment, a version history table, such as version history table 104 (FIG. 1) is created for each versioned resource stored in a repository. Each version history table is stored persistently. With two exceptions, each record in the version history table 104 corresponds to a link between successive versions of the resource to which the version history table 104 corresponds. One exception is a "virtual link" associated with the root of the version history tree 102 (FIG. 1), and another exception is a "virtual link" associated with each of one or more terminal nodes, or leaf nodes, of version history tree 102.

According to one embodiment, the data records in a version history table include data that represents the following:
(a) a record identifier (e.g., row_id 106 of FIG. 1) that uniquely identifies the record;
(b) a predecessor identifier (e.g., pred_id 108 of FIG. 1), which is a unique identifier of a version of the resource that immediately precedes, in the version history of the resource, the link corresponding to this record;
(c) a successor identifier (e.g., succ_id 110 of FIG. 1), which is a unique identifier of a version of the resource that immediately succeeds, in the version history of the resource, the link corresponding to this record;
(d) a predecessor rowset (e.g., pred_rowset 112 of FIG. 1), which comprises the record identifier of each record in which the predecessor identifier in this record is the successor identifier; and
(e) a successor rowset (e.g., succ_rowset 114 of FIG. 1), which comprises the record identifier of each record in which the successor identifier in this record is the predecessor identifier.

The predecessor rowsets and successor rowsets represent predecessor and successors, respectively, one level from the current level. Therefore, these rowsets are traversable to link together a chain of versions representing a version history. The following description refers to some of the records depicted in version history table 104 of FIG. 1, and describes the data structure underlying the version history table 104.

Row_id 01 is a record corresponding to a virtual link associated with the root version, version V1. Being the root version, version V1 has no predecessors and, therefore, there is no value or a null in pred_id 108 for row_id 01. The virtual link associated with version V1 has a single successor, which is version V1. Therefore, version V1 is identified in succ_id 110 for row_id 01.

Row_id 02 is a record corresponding to the link between version V1 and version V2 and, therefore, identifies version V1 in pred_id 108 and version V2 in succ_id 110. Because the predecessor of the link corresponding to row_id 02 is version V1 (as represented in pred_id 108), which appears in the succ_id 110 of row_id 01, the corresponding record identifier (e.g., row_id 01) appears in the predecessor rowset, pred_rowset 112. Because the successor of the link corresponding to row_id 02 is version V2 (as represented in succ_id 110), which appears in the pred_id 108 of row_id 03 and row_id 04, the corresponding record identifiers (e.g., row_id 03 and row_id 04) appear in the successor rowset, succ_rowset 114.

Because version V2 has two successors (version V3 and version V3.1) and, therefore, two successor links, there are two corresponding records in which version V2 is a predecessor. Thus, version V2 appears in pred_id 108 for two different records, row_id 03 and row_id 04.

Version V5 represents a merged file version, whereby version V5 is generated by merging version V4 with version V4.1. Thus, version V5 appears in succ_id 110 for each of the records with row_id 07 and row_id 08, whose predecessors are version V4 and version V4.1, respectively, which appear in pred_id 108.

Row_id 09 is a record corresponding to a virtual link associated with the only leaf node in version history tree 102 for file F1, where the leaf node represents version V5. Being a leaf version, version V5 has no successors and, therefore, there is no value or a null in succ_id 110 for row_id 09. The virtual link associated with version V5 has a single predecessor, which is version V5. Therefore, version V5 is identified in pred_id 108 for row_id 09. Because the predecessor of the link corresponding to row_id 09 is version V5, which appears in the succ_id 110 of row_id 07 and row_id 08, the corresponding record identifiers (e.g., row_id 07 and row_id 08) appear in the predecessor rowset, pred_rowset 112 of the record identified by row_id 09.

Each row in version history table 104 represents a single predecessor-successor relationship. Therefore, indexes can be created on each of the predecessor and successor columns, pred_id 108 and succ_id 110, respectively. Hence, given a version, the rows in this table in which the given version is a predecessor or a successor can be quickly identified using an index scan.

Further, in order to quickly locate the next level of predecessor relationships, pred_rowset 112 contains the row ids of all the rows in this table in which the current predecessor appears in the successor column. Thus, the pred_rowset provides easy access to the next higher level of ancestors (i.e., the predecessors of the current predecessor) and, likewise, the predecessor rowsets of this next higher level of ancestors, and so on, without performing another index scan. Similarly, succ_rowset 114 contains the row ids of all the rows in this table in which the current successor appears in the predecessor column. Thus, the succ_rowset provides easy access to the next lower level of descendants (i.e., the successors of the current successor) and, likewise, the successor rowsets of this next lower level of descendants, and so on, without performing another index scan.

In view of version history table 104, given a version, all the predecessors (i.e., the ancestor history) or successors (e.g., the descendant history) of the given version can be efficiently determined using a single recursive index scan. Because row_ids, from the version history table 104, are represented in the pred_id 108 and succ_id 110 columns of the same version history table 104, it is not necessary to perform multiple table scans to traverse version history table 104 to identify complete ancestor or descendant version histories. Thus, the version history query evaluation process does not have to reenter the version history table multiple times to completely identify a version history in one direction or the other and, therefore, processing overhead is minimized. A method for using a version history data container to efficiently respond to a version history query is described in greater detail hereafter.

It is noteworthy that the version history table 104 is, according to one embodiment, a separate table from resource table(s) 120 in which the actual content of the file versions are stored. Hence, the content of columns pred_id 108, succ_id 110, pred_rowset 112, and succ_rowset 114 is stored in a relatively small table separate from the content of the resources, rather than storing such version history information in the same relatively large table as the content of the resources, i.e., resource table(s) 120. The approach described herein enhances performance by minimizing processing overhead, avoiding overloading of buffer cache memory, etc., because entire rows of the resource table (including the content 124) need not be read from disk in order to identify the version histories.

Furthermore, with an approach in which only pred_id and succ_id were stored directly in the resource table 120, a functional evaluation would be needed. That is, the evaluation process would have to reenter the resource table multiple times to traverse through a chain of pred_ids or succ_ids and iteratively return results because for each predecessor or successor, an index scan would be needed to read the corresponding row. Additionally, this approach would suffer from serious concurrency issues because the root version is an ancestor of every other version. The foregoing type of evaluation is avoided by constructing the version history table 104 separate from the resource table 120. Still further, maintaining a version history table 104 separate from a corresponding resource table 120 allows for background updating of the version history table 104 without affecting transactions and operations on the resource table 120.

Responding to a Version History Query on the Repository

Figure 2A:
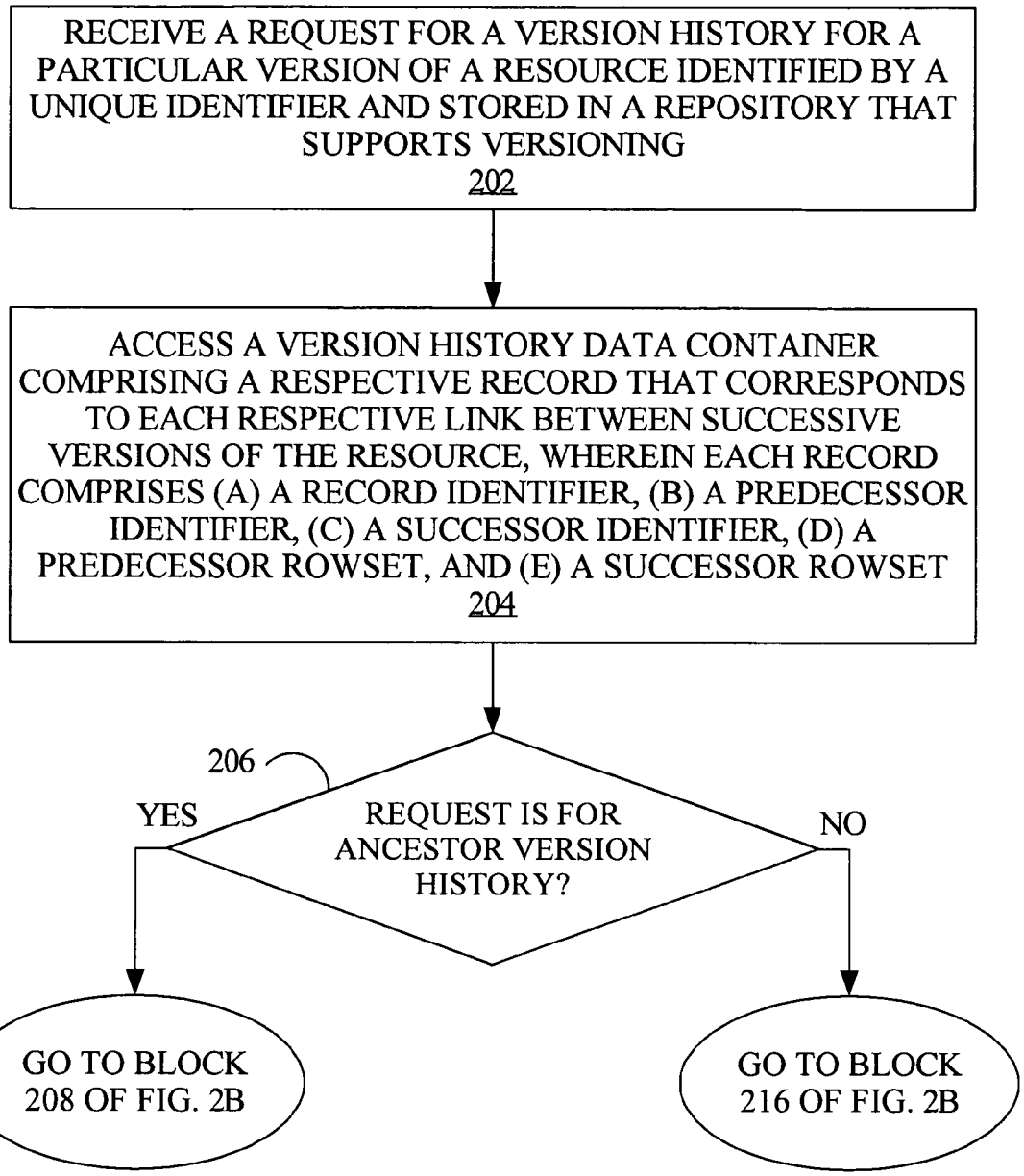
FIGS. 2A and 2B are flow diagrams that illustrate methods for processing a version history query on a repository that supports versioning of resources, according to an embodiment of the invention.
Figure 2B:
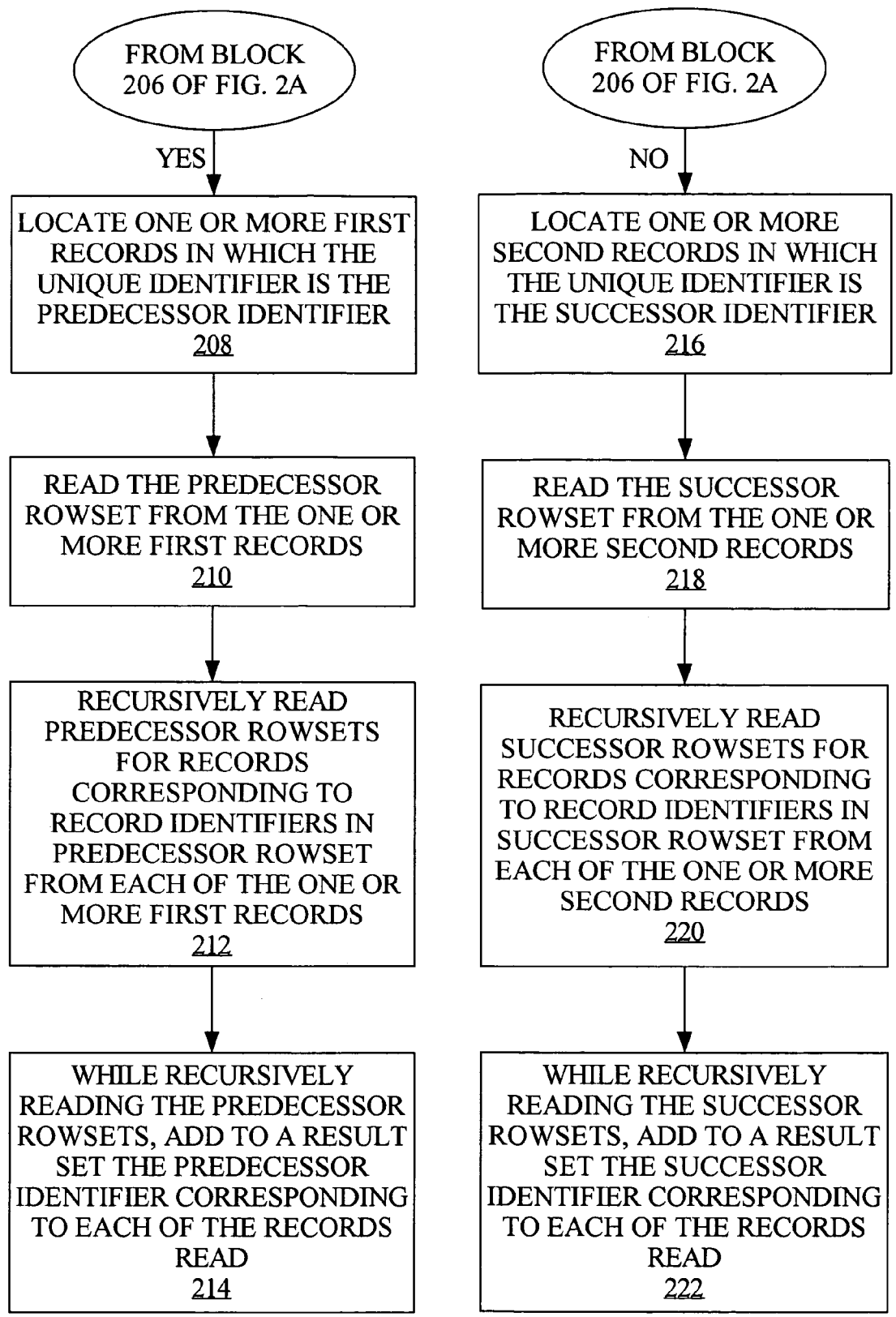

FIGS. 2A and 2B are flow diagrams that illustrate methods for processing a version history query on a repository that supports versioning of resources, according to an embodiment of the invention. The methods illustrated in FIGS. 2A and 2B are implemented for automated performance by a conventional computing system, such as computer system 300 of FIG. 3. One possible operating environment in which the methods of FIGS. 2A and 2B may be implemented is a database system. The process of FIGS. 2A and 2B embody approaches to evaluating a version history query, utilizing a data container data structure such as version history table 104 (FIG. 1).

At block 202, a request is received for a version history for a particular version of a resource identified by a unique identifier. For example, a database query is received which requests identification of all the ancestors of a specified file and version.

At block 204 a version history data container is accessed. For example, a version history table with a data structure similar to version history table 104 (FIG. 1) is accessed from persistent database storage. As described herein, the data structure of the version history container comprises a record for each link between successive versions of the resource (and the "virtual links" associated with root and leaf nodes, as described herein), where each record includes (a) a record identifier, (b) a predecessor identifier, (c) a successor identifier, (d) a predecessor rowset, and (e) a successor rowset, all of which are described in greater detail herein.

At decision block 206, determining what type of version history is requested, i.e., ancestor or descendant, determines which branch of logic to perform. The decision of block 206 may precede the step of block 204. Regardless, if the request received at block 202 is for an ancestor version history, then the process proceeds to block 208 of FIG. 2B. Otherwise, if the request received at block 202 is not for an ancestor version history, then the request is for a descendant version history and the process proceeds to block 216 of FIG. 2B. The request could be a request for both the ancestor and the descendant version histories, in which scenario both branches of logic depicted in FIG. 2B would be performed.

Identifying an Ancestor Version History

At block 208 of FIG. 2B, one or more first records are located, in the version history data container, in which the unique identifier specified in the request is the predecessor identifier. For an illustrative example, assume the query received at block 202 requested the ancestor version history for version V4 of version history tree 102 (FIG. 1). Version history table 104 is accessed and the pred_id 108 column is scanned in order to identify records in which this column contains 'V4'. Thus, the record identified by row_id 07 is located by the table scan operation, which effectively operates as an index scan of the pred_id 108 key with 'V4' as the key value.

At block 210, the predecessor rowset is read from each of the one or more first records. For example, pred_rowset 112 column is read from the row_id 07 record. This record column contains the value '05', which references the record identified by row_id 05 in the same version history table 104.

At block 212, predecessor rowsets are recursively read for records corresponding to record identifiers in the predecessor rowset from each of the one or more first records. This recursive reading is performed until a predecessor rowset is reached that has no value or a null. Block 214 illustrates that, while recursively reading the records corresponding to record identifiers in the predecessor rowsets (i.e., block 212), the predecessor identifier corresponding to each of the respective records that are read are added to a result set.

For example, the step of block 210 referenced the record identified by row_id 05, so the predecessor rowset, pred_rowset 112, of row_id 05 is read at block 212. This record column contains the value '03', which references the record identified by row_id 03 in the same version history table 104. The predecessor identifier, pred_id 108, of the record identified by row_id 05 is also read and its value 'V3' (or a comparable representation) is added to a result set at block 214.

Because the predecessor rowset of row_id 05 references row_id 03, the predecessor rowset, pred_rowset 112, of row_id 03 is read is read at block 212. This record column contains the value '02', which references the record identified by row_id 02 in the same version history table 104. The predecessor identifier, pred_id 108, of the record identified by row_id 03 is also read and its value 'V2' (or a comparable representation) is added to a result set at block 214.

Because the predecessor rowset of row_id 03 references row_id 02, the predecessor rowset, pred_rowset 112, of row_id 02 is read at block 212. This record column contains the value '01', which references the record identified by row_id 01 in the same version history table 104. The predecessor identifier, pred_id 108, of the record identified by row_id 02 is also read and its value 'V1' (or a comparable representation) is added to a result set at block 214.

Because the predecessor rowset of row_id 02 references row_id 01, the predecessor rowset, pred_rowset 112, of row_id 01 is read. This record column is empty or null, and the predecessor identifier, pred_id 108, of row_id 01 is also empty or null. Therefore, identification of the chain of predecessors of version V4 is completed. The result set contains {V3, V2, V1}, which represents the ancestor version history of version V4, as requested, which can be returned in response to the request.

Identifying a Descendant Version History

The logic associated with identifying a descendant version history (e.g., blocks 216-222 of FIG. 2B) is similar to the logic associated with identifying an ancestor version history (e.g., blocks 208-214 of FIG. 2B), but traverses the version history table 104 in the direction of successors rather than in the direction of predecessors, and is as follows. At block 216 of FIG. 2B, one or more second records are located in the version history data container, in which the unique identifier specified in the request is the successor identifier. For an illustrative example, assume the query received at block 202 requested the descendant version history for version V1 of version history tree 102 (FIG. 1). Version history table 104 is accessed and the succ_id 110 column is scanned in order to identify records in which this column contains 'V1'. Thus, the record identified by row_id 01 is located by the table scan operation, which effectively operates as an index scan of the succ_id 110 key with 'V1' as the key value.

At block 218, the successor rowset is read from each of the one or more first records. For example, succ_rowset 114 column is read from the row_id 01 record. This record column contains the value '02', which references the record identified by row_id 02 in the same version history table 104.

At block 220, successor rowsets are recursively read for records corresponding to record identifiers in the successor rowset from each of the one or more second records. This recursive reading is performed until a successor rowset is reached that has no value or a null. Block 222 illustrates that, while recursively reading the records corresponding to record identifiers in the successor rowsets (i.e., block 220), the successor identifier corresponding to each of the respective records that are read are added to a result set.

For example, the step of block 218 referenced the record identified by row_id 02, so the successor rowset, succ_rowset 114, of row_id 02 is read at block 220. This record column contains the values '03' and '04', which reference the respective records identified by row_id 03 and row_id 04 in the same version history table 104. The successor identifier, succ_id 110, of the record identified by row_id 02 is also read and its value 'V2' (or a comparable representation) is added to a result set at block 222.

Because the successor rowset of row_id 02 references row_id 03 and row_id 04, the successor rowset, succ_rowset 114, of row_id 03 and row_id 04 are read at block 220. These records contain the values '05' and '06' respectively, which reference the records identified by row_id 05 and row_id 06 in the same version history table 104. The successor identifier, succ_id 110, of the records identified by row_id 05 and row_id 06 are also read and their respective values 'V4' and "V4.1' (or comparable representations) are added to a result set at block 222.

Because the successor rowset of row_id 05 references row_id 07 and the successor rowset of row_id 06 references row_id 08, the successor rowset, succ_rowset 114, of row_id 07 and row_id 08 are read at block 220. These records both contain the value '09' (due to the version merge), which references the record identified by row_id 09 in the same version history table 104. The successor identifier, succ_id 110, of the records identified by row_id 07 and row_id 08 are also read and their respective value 'V5' (or a comparable representation) is added to a result set at block 222.

Because the successor rowset of row_id 07 and row_id 08 both reference row_id 09, the successor rowset, succ_rowset 114, of row_id 09 is read. This record column is empty or null, and the successor identifier, succ_id 110, of row_id 09 is also empty or null. Therefore, identification of the chain of successors of version V1 is completed. The result set contains {V2, V3, V3.1, V4, V4.1, V5}, which represents the descendant version history of version V1, as requested, which can be returned in response to the request.

As illustrated in reference to FIGS. 2A and 2B, the relatively large resource table containing the content of the resource versions need not even be accessed if the request is for a version history, rather than the for the content of the version history. If the request received at block 202 further requested all or a portion of the content of the versions in the requested version history, then result set(s) can be used as key values to index into the table column(s) in which the content is stored (e.g., content column 124 of resource table(s) 120 of FIG. 1). In order to fetch the contents from resource table 120 based on the version identifiers, a file/version identifier column could be implemented in the corresponding resource table(s) 120, or a separate mapping of file/version identifier-to-resource identifier (res_id 112) could be constructed and used, to locate the appropriate rows in resource table 120. The manner in which the correct version resources are located in a resource table, based on corresponding version identifiers, may vary from implementation to implementation.

Hardware Overview

Figure 3:
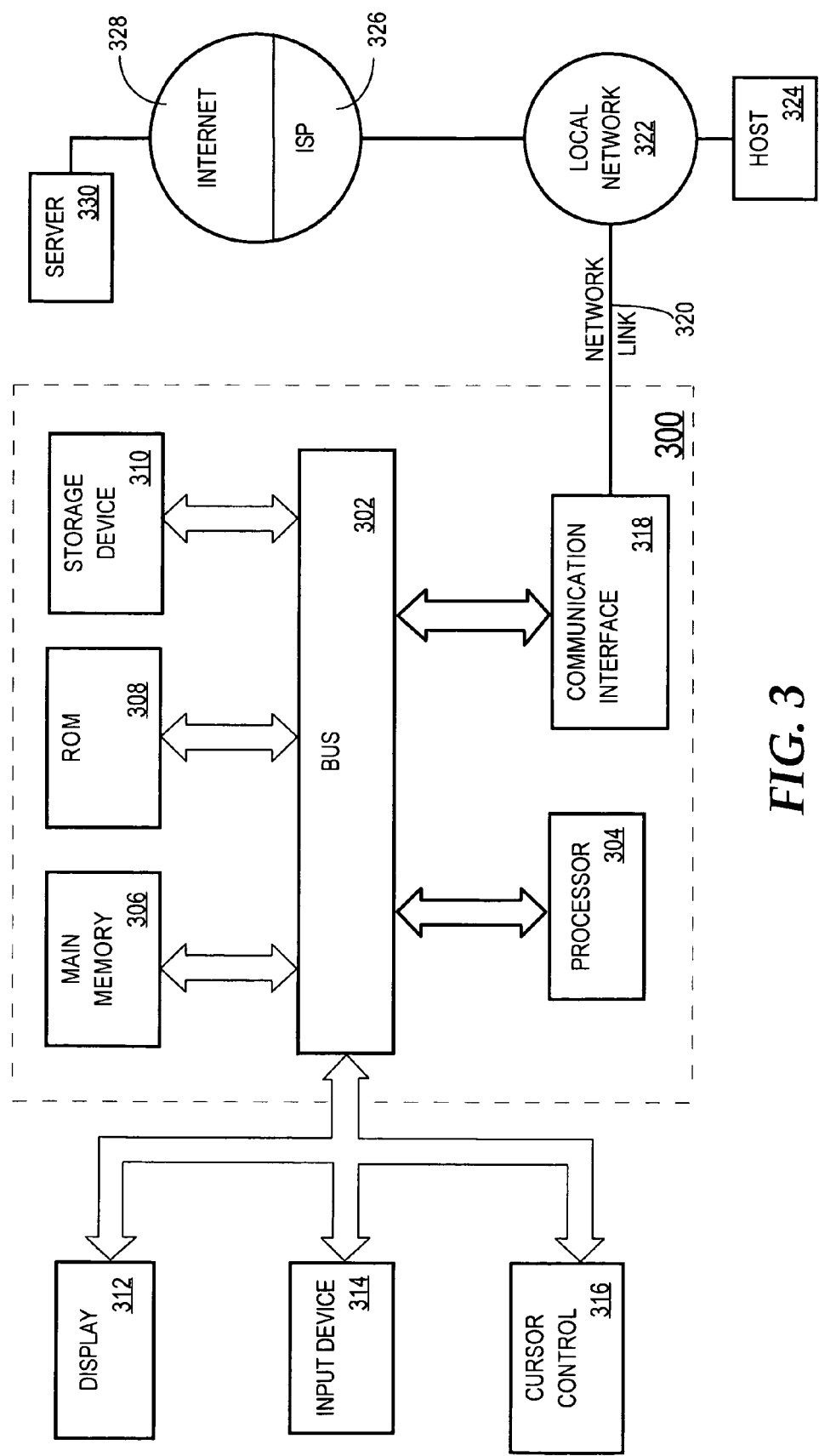
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   determining a version history for a particular version of a resource identified by a unique identifier, including:
   accessing a version history data table;
   wherein the version history data table includes a plurality of rows;
   wherein each particular row of the plurality of rows represents one and only one link between successive versions of said resource;
   wherein each particular row of the plurality of rows does not represent a particular version of said resource;

wherein said resource is stored in a database, said database supporting versioning of resources, wherein each row of the plurality of rows is associated with a row identifier that uniquely identifies said row, and each row represents:
- a predecessor identifier, wherein the predecessor identifier is a unique identifier of a version that immediately precedes, in said version history of said resource, the link corresponding to this row, and
- a successor identifier, wherein the successor identifier is a unique identifier of a version that immediately succeeds, in said version history of said resource, the link corresponding to this row,
- a predecessor rowset, wherein the predecessor rowset comprises the row identifier of each of one or more corresponding rows, in said version history data table, in which the predecessor identifier in this row is the successor identifier in a corresponding row of said one or more corresponding rows, and
- a successor rowset, wherein the successor rowset comprises the row identifier of each of one or more corresponding rows, in said version history data table, in which the successor identifier in this row is the predecessor identifier in a corresponding row of said one or more corresponding rows; and based on the unique identifier of said particular version of said resource, locating in said version history data table one or more rows in which the unique identifier of said particular version of said resource is one of either the predecessor identifier or the successor identifier;

wherein the steps of accessing and locating are performed by one or more computing devices.

2. The method of claim 1, wherein said step of determining includes determining an ancestor version history for said particular version of said resource, and wherein said step of locating further comprises the steps of:
locating one or more first rows in which the unique identifier of said particular version of said resource is the predecessor identifier;
reading the predecessor rowset from each of said one or more first rows;
recursively reading one or more predecessor rowsets for the rows corresponding to one or more row identifiers in the predecessor rowset from each of said one or more first rows until reading, for each recursion, a predecessor rowset that is empty or null; and
while performing said step of recursively reading said one or more predecessor rowsets, adding to a result set the predecessor identifier corresponding to each of the rows read.

3. The method of claim 2, further comprising the steps of:
determining one or more resource identifiers corresponding to respective one or more predecessor identifiers in said result set;
accessing a resource data table that is a different data table than said version history data table, wherein resources in said resource data table are identified by corresponding resource identifiers; and
reading, from said resource data table, one or more resources corresponding to said one or more resource identifiers.

4. The method of claim 3, further comprising the steps of:
while performing a database operation that involves said resource data table, updating said version history data table.

5. The method of claim 1, wherein said step of determining includes determining a descendant version history for said particular version of said resource, and wherein said step of locating further comprises the steps of:
locating one or more first rows in which the unique identifier of said particular version of said resource is the successor identifier;
reading the successor rowset from each of said one or more first rows;
recursively reading one or more successor rowsets for the rows corresponding to one or more row identifiers in the successor rowset from each of said one or more first rows until reading, for each recursion, a successor rowset that is empty or null; and
while performing said step of recursively reading said one or more successor rowsets, adding to a result set the successor identifier corresponding to each of the rows read.

6. The method of claim 5, further comprising the steps of:
determining one or more resource identifiers corresponding to respective one or more successor identifiers in said result set;
accessing a resource data table that is a different data table than said version history data table, wherein resources in said resource data table are identified by corresponding resource identifiers; and
reading, from said resource data table, one or more resources corresponding to said one or more resource identifiers.

7. The method of claim 1, wherein each row contains the predecessor identifier, the successor identifier, the predecessor rowset, and the successor rowset.

8. The method of claim 1, further comprising the steps of:
in response to a process in which a modified version of a first resource is checked into said database,
creating one or more new rows in said version history data table by, for each of the one or more new rows,
generating a row identifier that uniquely identifies the row,
inserting in the row a predecessor identifier corresponding to a version of said first resource that immediately precedes said modified version of said first resource,
inserting in the row a successor identifier corresponding to said modified version of said first resource, and
inserting in the row a predecessor rowset comprising the row identifier of each of one or more corresponding rows, in said version history data table, in which the predecessor identifier corresponding to the version of said first resource that immediately precedes said modified version of said first resource is the successor identifier in a corresponding row of said one or more corresponding rows; and
updating each row, in said version history data table, in which the successor identifier corresponds to a version of said first resource that immediately precedes said modified version of said first resource, by,
updating the successor rowset to include the row identifier of each of said one or more new rows.

9. A computer-readable storage medium storing a data structure in which data is stored, wherein each particular row of one or more rows in said data structure represents one and only one link between successive versions of a resource stored in a database that supports versioning of resources, wherein each particular row of the one or more rows does not represent a particular version of said resource, wherein each row is associated with a row identifier that uniquely identifies the row, and wherein said data structure comprises:

a first field for storing a predecessor identifier, wherein the predecessor identifier is a unique identifier of a version that immediately precedes the link corresponding to this row;

a second field for storing a successor identifier, wherein the successor identifier is a unique identifier of a version that immediately succeeds the link corresponding to this row;

a third field for storing a predecessor rowset, wherein the predecessor rowset comprises the row identifier of each of one or more corresponding predecessor rows, in said data structure, in which the predecessor identifier in this row is the successor identifier in a corresponding row of said one or more corresponding predecessor rows; and a fourth field for storing a successor rowset, wherein the successor rowset comprises the row identifier of each of one or more corresponding successor rows, in said data structure, in which the successor identifier in this row is the predecessor identifier in a corresponding row of said one or more corresponding successor rows.

10. A computer-readable storage medium storing instruction for including instructions for performing the steps of:

determining a version history for a particular version of a resource identified by a unique identifier, including:

accessing a version history data table;

wherein the version history data table includes a plurality of rows;

wherein each particular row of the plurality of rows represents one and only one link between successive versions of said resource;

wherein each particular row of the plurality of rows does not represent a particular version of said resource;

wherein said resource is stored in a database, said database supporting versioning of resources, wherein each row of the plurality of rows is associated with a row identifier that uniquely identifies said row, and each row represents:

a predecessor identifier, wherein the predecessor identifier is a unique identifier of a version that immediately precedes, in said version history of said resource, the link corresponding to this row, and a successor identifier, wherein the successor identifier is a unique identifier of a version that immediately succeeds, in said version history of said resource, the link corresponding to this row, a predecessor rowset, wherein the predecessor rowset comprises the row identifier of each of one or more corresponding rows, in said version history data table, in which the predecessor identifier in this row is the successor identifier in a corresponding row of said one or more corresponding rows, and a successor rowset, wherein the successor rowset comprises the row identifier of each of one or more corresponding rows, in said version history data table, in which the successor identifier in this row is the predecessor identifier in a corresponding row of said one or more corresponding rows; and based on the unique identifier of said particular version of said resource, locating in said version history data table one or more rows in which the unique identifier of said particular version of said resource is one of either the predecessor identifier or the successor identifier.

11. The computer-readable storage medium of claim 10, wherein said step of determining includes determining an ancestor version history for said particular version of said resource, and wherein said step of locating further comprises the steps of:

locating one or more first rows in which the unique identifier of said particular version of said resource is the predecessor identifier;

reading the predecessor rowset from each of said one or more first rows;

recursively reading one or more predecessor rowsets for the rows corresponding to one or more row identifiers in the predecessor rowset from each of said one or more first rows until reading, for each recursion, a predecessor rowset that is empty or null; and while performing said step of recursively reading said one or more predecessor rowsets, adding to a result set the predecessor identifier corresponding to each of the rows read.

12. The computer-readable storage medium of claim 11, wherein the instructions further comprise instructions for performing the steps of:

determining one or more resource identifiers corresponding to respective one or more predecessor identifiers in said result set;

accessing a resource data table that is a different data table than said version history data table, wherein resources in said resource data table are identified by corresponding resource identifiers; and reading, from said resource data table, one or more resources corresponding to said one or more resource identifiers.

13. The computer-readable storage medium of claim 12, wherein the instructions further comprise instructions for performing the step of:

while performing a database operation that involves said resource data table, updating said version history data table.

14. The computer-readable storage medium of claim 10, wherein said step of determining includes determining a descendant version history for said particular version of said resource, and wherein said step of locating further comprises the steps of:

locating one or more first rows in which the unique identifier of said particular version of said resource is the successor identifier;

reading the successor rowset from each of said one or more first rows;

recursively reading one or more successor rowsets for the rows corresponding to one or more row identifiers in the successor rowset from each of said one or more first rows until reading, for each recursion, a successor rowset that is empty or null; and while performing said step of recursively reading said one or more successor rowsets, adding to a result set the successor identifier corresponding to each of the rows read.

15. The computer-readable storage medium of claim 14, wherein the instructions further comprise instructions for performing the steps of:

determining one or more resource identifiers corresponding to respective one or more successor identifiers in said result set;

accessing a resource data table that is a different data table than said version history data table, wherein resources in said resource data table are identified by corresponding resource identifiers; and reading, from said resource data table, one or more resources corresponding to said one or more resource identifiers.

16. The computer-readable storage medium of claim 10, wherein the instructions further comprise instructions for performing the steps of:

in response to a process in which a modified version of a first resource is checked into said database, creating one or more new rows in said version history data table by, for each of the one or more new rows, generating a row identifier that uniquely identifies the row, inserting in the row a predecessor identifier corresponding to a version of said first resource that immediately precedes said modified version of said first resource, inserting in the row a successor identifier corresponding to said modified version of said first resource, and inserting in the row a predecessor rowset comprising the row identifier of each of one or more corresponding rows, in said version history data table, in which the predecessor identifier corresponding to the version of said first resource that immediately precedes said modified version of said first resource is the successor identifier in a corresponding row of said one or more corresponding rows; and updating each row, in said version history data table, in which the successor identifier corresponds to a version of said first resource that immediately precedes said modified version of said first resource, by, updating the successor rowset to include the row identifier of each of said one or more new rows.

17. The computer-readable storage medium of claim 10, wherein each row contains the predecessor identifier, the successor identifier, the predecessor rowset, and the successor rowset.

* * * * *

UNITED STATES PATENT AND TRADEMARK OFFICE
CERTIFICATE OF CORRECTION

| | | |
|---|---|---|
| PATENT NO. | : 7,730,032 B2 | Page 1 of 1 |
| APPLICATION NO. | : 11/332117 | |
| DATED | : June 1, 2010 | |
| INVENTOR(S) | : Sam Idicula et al. | |

It is certified that error appears in the above-identified patent and that said Letters Patent is hereby corrected as shown below:

On page 3, in column 2, under "Other Publications", line 52, delete "SIGMOND" and insert -- SIGMOD --, therefor.

In column 10, line 9, delete ""V4.1'" and insert -- "V4.1" --, therefor.

Signed and Sealed this

Second Day of August, 2011

David J. Kappos
*Director of the United States Patent and Trademark Office*